United States Patent
Lee et al.

(10) Patent No.: US 6,892,798 B2
(45) Date of Patent: May 17, 2005

(54) RAPID THERMAL STORAGE/RELEASE SYSTEM USING A POROUS MEMBER

(75) Inventors: Dae-Young Lee, Seoul (KR); Seo-Young Kim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/330,248

(22) Filed: Dec. 30, 2002

(65) Prior Publication Data

US 2003/0121637 A1 Jul. 3, 2003

(30) Foreign Application Priority Data

Dec. 31, 2001 (KR) .................................. 10-2001-0089318

(51) Int. Cl.[7] .................................................. F28D 15/00
(52) U.S. Cl. .................. 165/104.12; 165/902; 165/907; 165/10; 62/480; 62/477; 62/46.2
(58) Field of Search ............................ 165/104.12, 185, 165/4, 10, 902, 907; 62/477, 480, 46.2

(56) References Cited

U.S. PATENT DOCUMENTS

| | | | | |
|---|---|---|---|---|
| 4,064,914 A | * | 12/1977 | Grant .......................... | 138/142 |
| 4,131,158 A | * | 12/1978 | Abhat et al. ............ | 165/104.14 |
| 4,222,434 A | * | 9/1980 | Clyde .......................... | 165/10 |
| 4,457,136 A | * | 7/1984 | Nishizaki et al. ............ | 62/46.2 |
| 4,572,864 A | * | 2/1986 | Benson et al. ........... | 428/305.5 |
| 4,993,481 A | * | 2/1991 | Kamimoto et al. ........... | 165/10 |
| 5,184,669 A | * | 2/1993 | Tamme et al. ................ | 165/10 |
| 5,231,968 A | * | 8/1993 | Siefkes ........................ | 123/549 |
| 5,384,101 A | * | 1/1995 | Rockenfeller ............... | 422/211 |
| 5,485,675 A | * | 1/1996 | Jones et al. ............ | 29/890.046 |
| 5,585,145 A | * | 12/1996 | Maier-Laxhuber et al. . | 427/380 |
| 5,847,927 A | * | 12/1998 | Minning et al. ............ | 361/696 |
| 6,105,659 A | * | 8/2000 | Pocol et al. .................. | 165/10 |
| 6,182,717 B1 | * | 2/2001 | Yamashita .................... | 141/82 |
| 6,224,784 B1 | * | 5/2001 | Hayes ......................... | 252/70 |
| 6,318,453 B1 | * | 11/2001 | Ovshinsky et al. ..... | 165/104.12 |
| 6,378,605 B1 | * | 4/2002 | Kutscher et al. ............ | 165/181 |
| 6,481,216 B2 | * | 11/2002 | Simmons et al. ................ | 62/6 |

FOREIGN PATENT DOCUMENTS

| | | |
|---|---|---|
| CN | 2297697 | 11/1998 |
| JP | 7-253284 | * 11/1993 |

* cited by examiner

Primary Examiner—Terrell Mckinnon
(74) Attorney, Agent, or Firm—Brich, Stewart, Kolasch & Birch LLP

(57) ABSTRACT

A heat exchanger for storing or releasing heat including a channel unit in which a heat medium flows; and a heat exchange unit contacted-combined with the channel unit and containing a porous heat transfer member which conducts heat exchange with a thermal storage material.

9 Claims, 4 Drawing Sheets

RAPID THERMAL STORAGE/RELEASE SYSTEM USING A POROUS MEMBER

This non-provisional application claims priority under 35 U.S.C. §119(a) on Patent Application No. 10-2001-0089318 filed in Korea on Dec. 31, 2001, which is herein incorporated by reference.

BACKGROUND OF THE INVENTION

1. Field of the Invention

The present invention relates to a thermal storage/release system, and in particular to a thermal storage/release system for storing or releasing latent heat energy using porous members.

2. Description of the Prior Art

A latent heat storage system, as one of the heat storage systems, uses latent heat generated according to phase transition (for example water to/from ice) of a thermal storage material, and it can be divided into a type of system for congealing or melting phase transition material used as the thermal storage material around a heat exchanger tube and into a type of system for storing and releasing heat energy generated by the phase transition of thermal storage material contained in a sealed casing.

In any system, the distance between a heat transfer surface (tube wall surface or surface of the sealed casing) and a phase transition boundary surface is increased according to the progress of phase transition, and the heat transfer resistance due to the presence of thermal storage material filled between the surfaces is increased.

Accordingly, according to the progress of congelation or melting of the thermal storage material, the congelation speed or the melting speed is lowered, and therefore the heat storage and release efficiencies are lowered.

SUMMARY OF THE INVENTION

In order to solve the above-mentioned problem, it is an object of the present invention to provide a thermal storage/release system that is capable of improving the congelation or melting speed of thermal storage material and improving heat storage and release efficiencies.

In order to achieve the above-mentioned object, a thermal storage/release system in accordance with the present invention includes a channel unit through which a heat transfer medium flows; and at least one thermal storage unit including at least one housing having an empty space therein in contact with the channel unit, a thermal storage material contained in the housing to store/release heat energy by a phase transition between a solid state and a liquid state, at least one porous member extending from the channel unit into the housing to exchange heat with the thermal storage material therethrough.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Hereinafter, the preferred embodiments of a thermal storage/release system in accordance with the present invention will be described in detail with reference to accompanying drawings.

As depicted in FIGS. 1 to 4, the thermal storage/release system in accordance with the present invention comprises a channel unit 20 in which heat transfer medium flows; and a thermal storage unit 10 including a plurality of housings 13 having an empty space therein contacted-combined with the channel unit 20, a thermal storage material contained in the housings 13 to store/release heat energy by a phase transition between solid state and liquid state, and a plurality of porous members 1 extending from the channel unit 20 into the housing to exchange heat with the thermal storage material therethrough.

Figure 4:
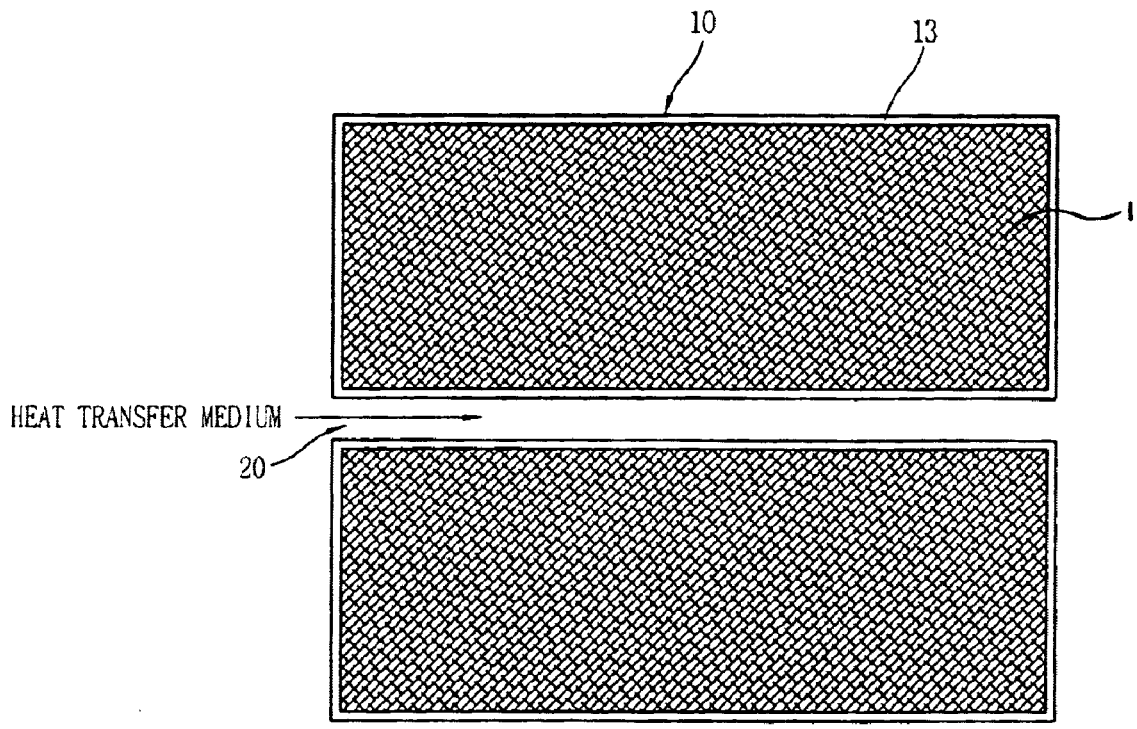
FIG. 4 is a sectional view illustrating a second embodiment of the thermal storage/release system in accordance with the present invention.

As depicted in FIG. 4, in the thermal storage/release system in accordance with a first embodiment of the present invention, the channel unit 20 consists of a pipe through which the heat transfer medium flows. And, the thermal storage unit 10 has a housing 13 contacted-combined with the outer surface of the channel unit 20. The pipe can be formed as a general pipe shape or as a plate shape having regular intervals.

The channel unit 20 is connected-installed to a channel pipe (not shown). The heat transfer medium, after completing the heat exchange while passing through the channel unit 20, is transferred to an external heat exchange unit (not shown) through the channel pipe. The heat transfer medium absorbs or releases heat in the external unit.

The porous members 1 is formed in the empty space in the housing 13. And there is interstitial void volume between the porous members 1. The thermal storage material—(e.g. water) filled with the housing 13 exchanges heat with the heat transfer medium (e.g. vapor) in the channel unit 20 through the porous members 1 with improved speed and efficiency.

In more detail, by using a porous member 1 having a high thermal conductivity and a large interstitial surface area therebetween, the thermal conductance through the thermal storage material (e.g. water) increases enormously, and accordingly the speed of heat exchange can be improved. For high thermal conductance, it is more preferable for the porous member 1 to be made of a foam metal, more specifically, aluminum foam.

Though various phase change materials may be used as the thermal storage material, water is most widely used, because it is free of environmental contamination and possesses substantial amount of latent heat in phase transition.

In case of water, the volume is largely varied in phase transition between water and ice. In this case, as depicted in FIGS. 2 and 3, in the thermal storage/release system in accordance with the first embodiment, the thermal storage unit 10 includes a plurality of porous members 1, each porous member 1 is combined with the channel unit 20 at a predetermined interval, i.e. intervals portions 12, and accordingly it is possible to absorb volume variations according to the phase transition of the thermal storage material.

Figure 1:
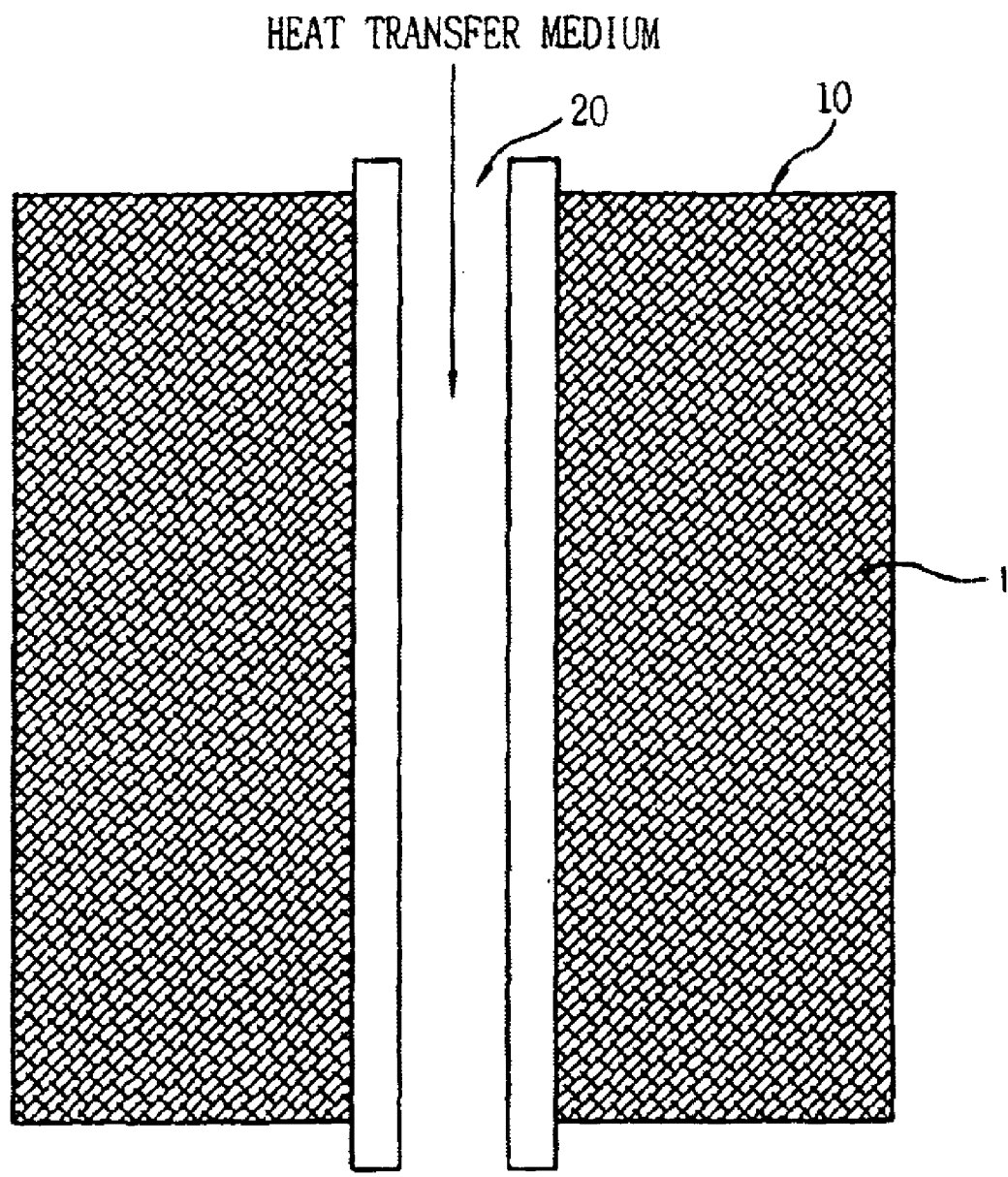
FIG. 1 is a sectional view illustrating a first embodiment of a thermal storage/release system in accordance with the present invention.
Figure 2:
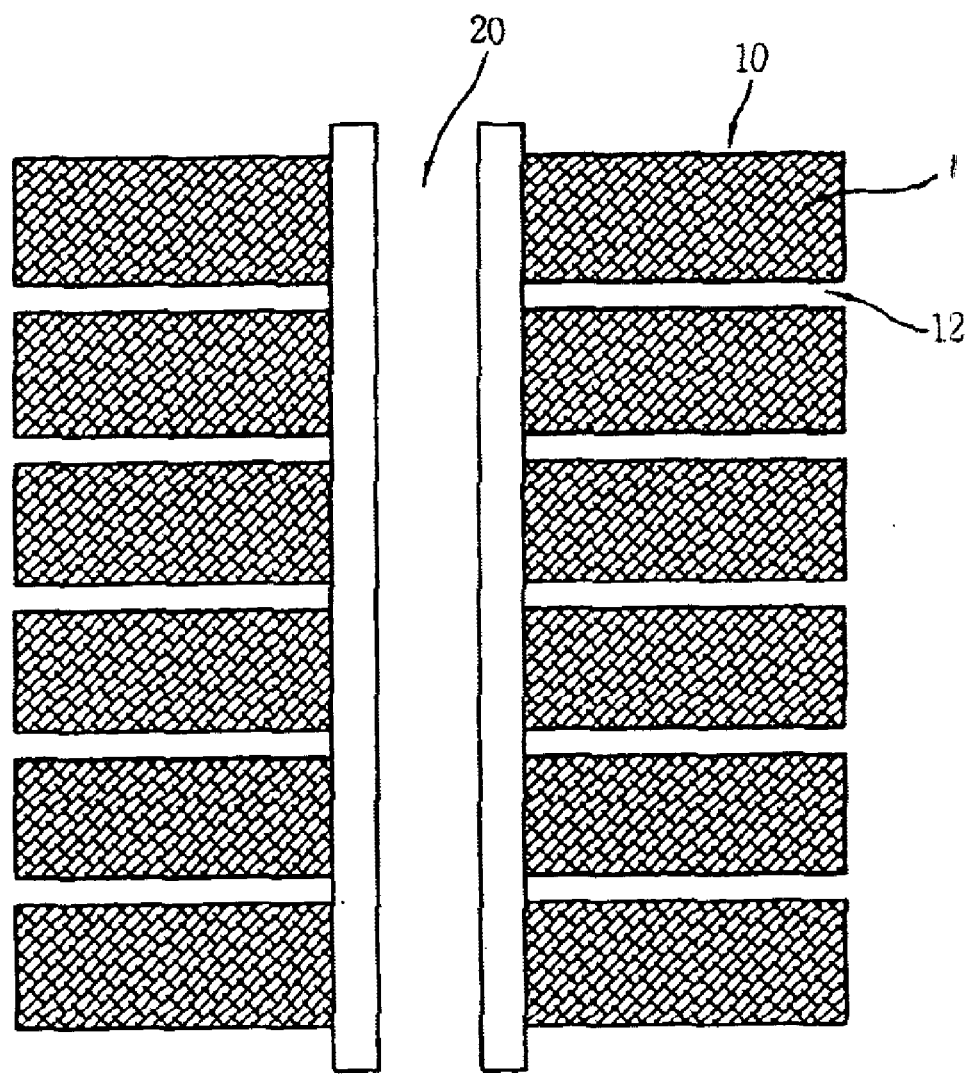
FIG. 2 is a sectional view illustrating a modified example of the thermal storage/release system of FIG. 1.

In more detail, as depicted in FIG. 2, in the thermal storage/release system in accordance with the present invention, when the volume of the thermal storage material is expanded by phase transition (i.e. from liquid phase to solid phase for water), the thermal storage material (e.g. water) is pushed out of the porous member 1, and accordingly there is little deformation in the porous member 1 due to the volume expansion of the thermal storage material.

Figure 3:
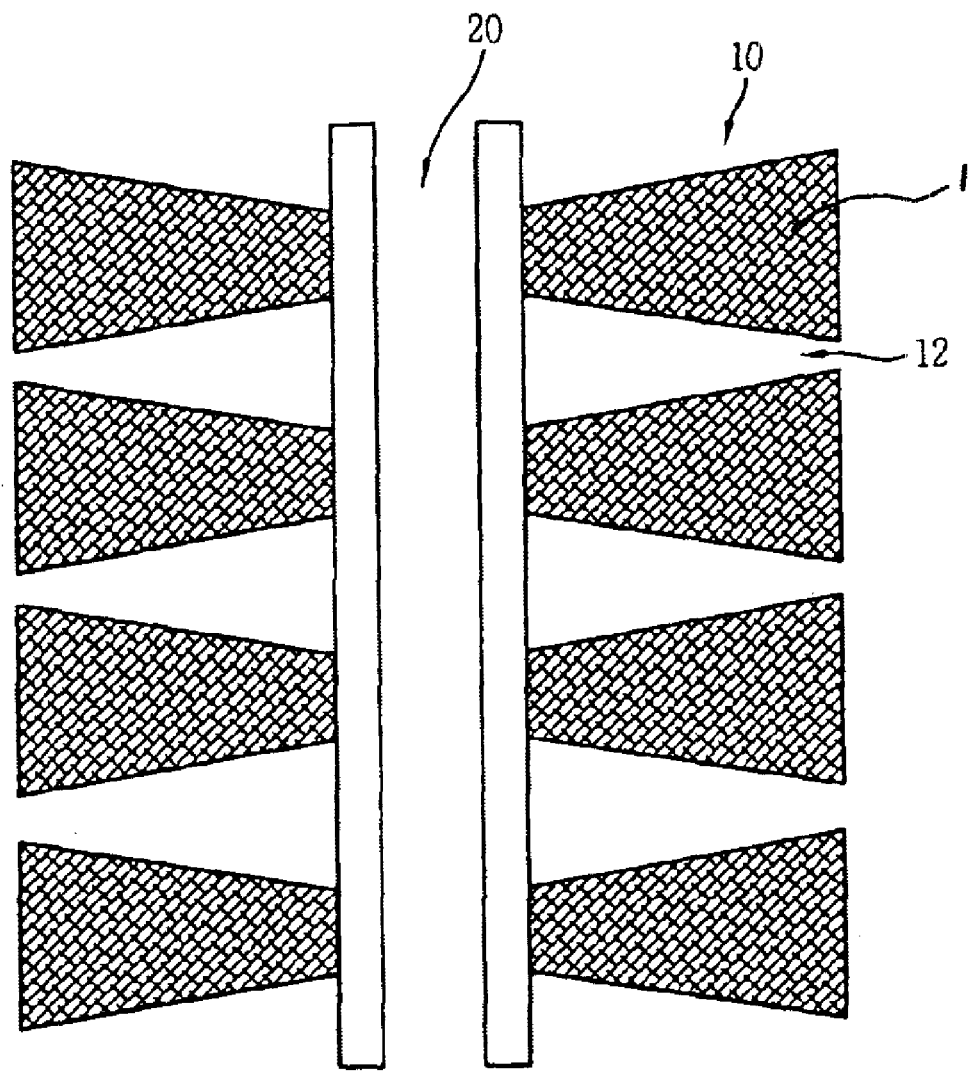
FIG. 3 is a sectional view illustrating another modified example of the thermal storage/release system of FIG. 1.

In particular, because the greater amount of heat exchange occurs at a position abutting the channel unit 20, as depicted in FIG. 3, the further the interval portions 12 extend away from the channel unit 20, the narrower the width of the interval portions 12 become. That is, the further the porous members 1 extend away from the channel unit 20, the broader the width of the porous members 1. Therefore, as the thermal storage material (e.g. water) is far away from the channel unit 20, the thermal storage material has larger contact surface with the porous member 1 to exchange heat. Accordingly, both the thermal storage material near the channel unit 20 and the thermal storage material far from the channel unit 20 exchange a similar amount of heat energy with the porous member 1 thereby attaining the performance of simultaneous storage/release regardless of the location of the thermal storage material.

As depicted in FIG. 4, a housing 13 covers the exterior of the thermal storage unit 10 in which the porous member 1 is disposed so as to fill the thermal storage unit 10. Also, the channel unit 20 is combined with or in contact with the exterior of the housing 13.

Figure 5:
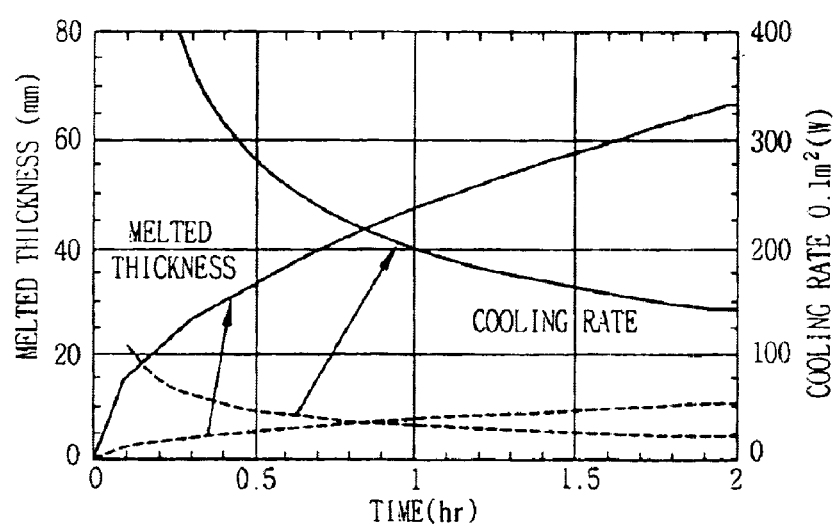
FIG. 5 is a graph showing the performance of the thermal storage/release system in accordance with the present invention in comparison with a conventional thermal storage system.

FIG. 5 is a graph showing the performance of the thermal storage/release system in accordance with the present invention in comparison with a conventional thermal storage/release system. It shows a thawing thickness and a heat release rate of the thermal storage/release system using porous aluminum having 92% of porosity.

The dotted line shows the performance of the conventional thermal storage/release system, and the solid line shows a performance of the thermal storage/release system of present invention in accordance with the present invention. As depicted in FIG. 5, the heat release performance of the present invention is exceedingly superior to that of the conventional thermal storage/release system.

Herein, the porosity is an important factor. When the porosity is excessively high, the heat transfer rate is low and there is not much difference between the present and the conventional thermal storage/release system in a heat release or heat storage time aspects. On the contrary, when the porosity is very low, the heat storage capacity is lowered due to a decrease in the quantity of the thermal storage material disposed around the porous member. Accordingly, it is preferable for the porous member 1 to have a porosity about 80–95%.

In the thermal storage/release system in accordance with the present invention, because the heat resistance between a heat transfer surface and the phase transition boundary surface is greatly reduced due to the high thermal conductance of the porous member 1, although the interval between the plurality of the porous members 1 is increased and/or the width of the housing 13 including the porous member 1 is increased, it is possible to cause the heat storage and release efficiencies to be higher than those of the conventional thermal storage/release system, and accordingly the thermal storage rate per unit volume of the thermal storage/release system of the present invention can be increased.

In addition, in the conventional thermal storage/release system, because the heat discharge rate is greatly reduced with the progress of heat release, it may be impossible to supply the heat release quantity corresponding to an instant large heat load even though the stored heat capacity is sufficient, and accordingly an excessively large storage unit has to be installed or simultaneous operation of both the storage unit and the refrigerator has to be applied.

However, in the thermal storage/release system of the present invention, even when the heat load varies largely with time, it is possible to supply the heat release quantity corresponding to a heat load due to the quick congealing and melting capability resulting from the high thermal conductance of the porous member 1.

In the present invention, the thermal storage/release system is capable of improving the congelation or melting speed of the thermal storage material (e.g. water) and improving heat storage and release efficiencies. In addition, in the design of a thermal storage/release system or in the determination of the operation method, there is no need to consider the restrictions from the heat storage/discharge rate decreasing with the progress of the storage/discharge process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A thermal storage/release system, comprising:
   a channel unit through which a heat transfer medium flows; and
   a plurality of porous members extending from the channel unit, separated by a plurality of interval portions formed between the porous members, the porous members having a thermal storage material therein,
   wherein as the interval portions extend away from the channel unit, the interval portions become more narrow.

2. The thermal storage/release system of claim 1, wherein the channel unit is a pipe.

3. The thermal storage/release system of claim 1, wherein the channel unit has a plate shape.

4. The thermal storage/release system of claim 1 wherein the thermal storage material is water.

5. The thermal storage/release system of claim 1, wherein a porosity of the porous members is about 80 to 95%.

6. The thermal storage/release system of claim 1, wherein the thermal storage/release system has a housing.

7. The thermal storage/release system of claim 1, wherein the porous members are made of aluminum.

8. The thermal storage/release system of claim 1, wherein the porous members are made of aluminum foam.

9. The thermal storage/release system of claim 1, wherein the porous members are made of metal.

* * * * *